United States Patent
Doyle

(10) Patent No.: US 9,995,506 B2
(45) Date of Patent: Jun. 12, 2018

(54) CABLE DRIVE SYSTEM FOR SOLAR TRACKING

(71) Applicant: SULAS INDUSTRIES, INC., Silverthorne, CO (US)

(72) Inventor: Fintan Joseph Doyle, Silverthorne, CO (US)

(73) Assignee: Sulas Industries, Inc., Silverthorne, CO (US)

( * ) Notice: Subject to any disclaimer, the term of this patent is extended or adjusted under 35 U.S.C. 154(b) by 792 days.

(21) Appl. No.: 14/518,366

(22) Filed: Oct. 20, 2014

(65) Prior Publication Data

US 2015/0107583 A1   Apr. 23, 2015

Related U.S. Application Data

(60) Provisional application No. 61/893,238, filed on Oct. 20, 2013.

(51) Int. Cl.
  *F24J 2/38* (2014.01)
  *F24J 2/54* (2006.01)
  *F24J 2/52* (2006.01)

(52) U.S. Cl.
  CPC ............... *F24J 2/38* (2013.01); *F24J 2/541* (2013.01); *F24J 2002/5286* (2013.01); *F24J 2002/5458* (2013.01); *F24J 2002/5468* (2013.01); *Y02B 10/20* (2013.01); *Y02E 10/47* (2013.01)

(58) Field of Classification Search
  CPC ........ F24J 2/38; F24J 2/541; F24J 2002/5286; F24J 2002/5458; F24J 2002/5468; Y02B 10/20; Y02E 10/47
  See application file for complete search history.

(56) References Cited

U.S. PATENT DOCUMENTS

| 4,425,904 | A | 1/1984 | Butler |
| 4,649,899 | A | 3/1987 | Moore |
| 7,380,549 | B1 * | 6/2008 | Ratliff ...................... F24J 2/07 126/600 |
| 8,119,963 | B2 | 2/2012 | Scanlon |
| 8,274,028 | B2 | 9/2012 | Needham |
| 8,399,759 | B2 | 3/2013 | Luo |
| 8,476,521 | B2 | 7/2013 | Luo |
| 2009/0025708 | A1 | 1/2009 | Shingleton |
| 2010/0192942 | A1 | 8/2010 | Jones |

FOREIGN PATENT DOCUMENTS

EP   0582839 A1   2/1994

* cited by examiner

*Primary Examiner* — Alfred Basichas
(74) *Attorney, Agent, or Firm* — Holland & Hart LLP

(57) ABSTRACT

A cable drive system for solar tracking for solar array systems. The cable drive system employs one or more cables wound around a drive pulley of a drive device and one or more driven pulleys of respective rotatable solar assemblies of the solar array system. The system may use a tension device such as a spring or weight that returns the solar array system to an initial position at the end of the day. The drive device may be an active or passive solar tracker. The disclosed techniques of rotating solar panels are flexible, inexpensive, and reliable. The techniques can apply to any solar technology that benefit from following the sun.

19 Claims, 11 Drawing Sheets

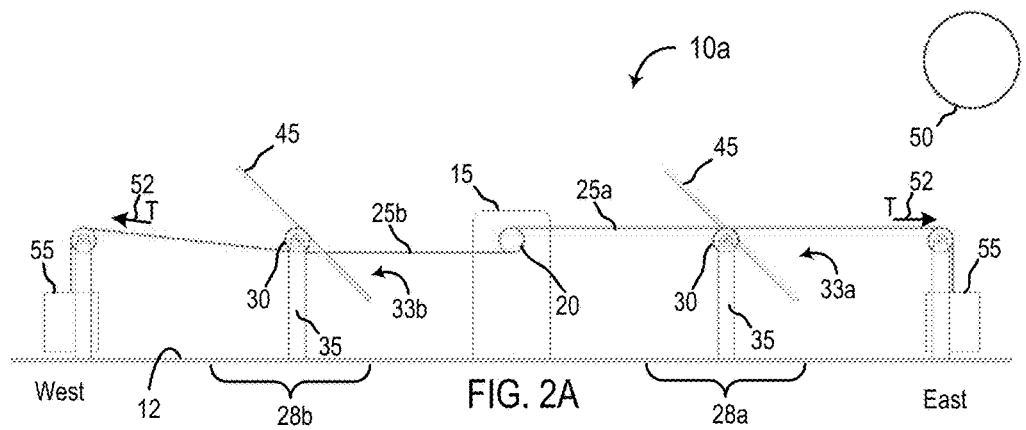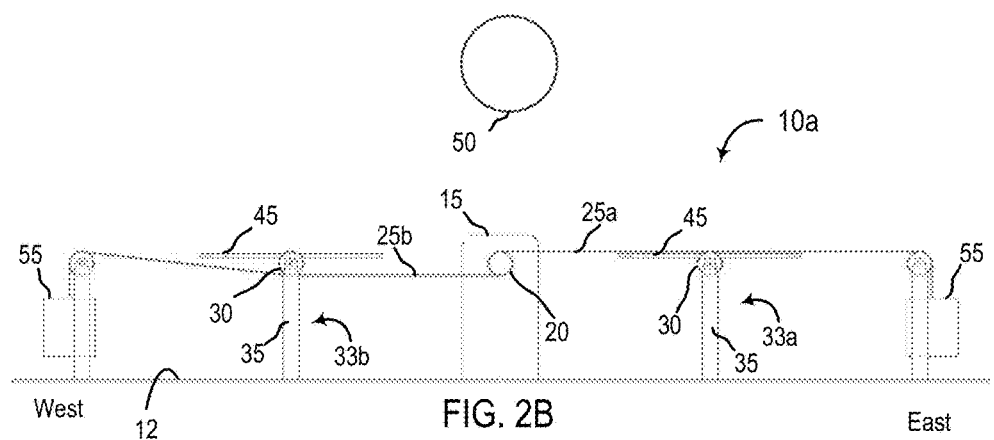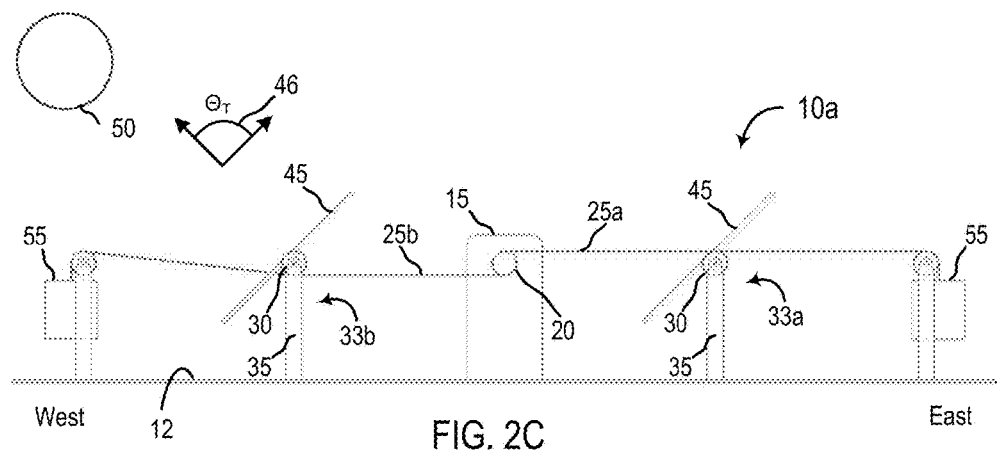

CABLE DRIVE SYSTEM FOR SOLAR TRACKING

CROSS REFERENCE

This application claims the benefit of and priority to U.S. Provisional Application No. 61/893,238, filed Oct. 20, 2013, titled "CABLE DRIVE SYSTEM FOR SOLAR TRACKER," which is incorporated herein by reference in its entirety for all purposes.

BACKGROUND

1. Field

This application relates generally to the field of solar energy, and more particularly to solar tracking for solar array systems.

2. Relevant Background

Renewable energy sources are increasingly seen as the solution to meeting growing energy demands while reducing greenhouse gas emissions and dependence on fossil fuels. Government energy policies, advances in renewable energy technology, and increased investment have contributed to rapid growth of many different renewable energy technologies.

Solar energy devices are one of the fastest growing segments of the renewable energy landscape. For example, the amount of world-wide solar power capacity installed in 2013 increased roughly 35% over prior years. In 2013 alone, an estimated 37 Giga-Watts of photovoltaic ("PV") solar power capacity was added world-wide. Other solar energy technologies that are in use or development include concentrating solar power ("CSP"), solar hot water heating systems, solar food cookers, solar crop dryers, solar distilleries and desalinators, and the like.

Cost is a major driver for renewable energy installations. Because solar energy systems do not use fuel, the costs for solar power systems are dominated by the capital cost of installation and maintenance costs. While the cost of some solar energy technologies such as photovoltaics are declining due to advances in technology and increases in manufacturing scale and sophistication, continuing to reduce capital and maintenance costs is an important driver to competing against other power sources such as nuclear power and fossil fuels.

In solar energy systems, efficiency is an important aspect of useful energy output of the system. For example, commercial PV cells typically have less than 20% conversion efficiency of incident solar energy. Other factors affecting solar energy generation include the amount of incident solar energy at the installation site and incident angle of solar radiation on the solar energy system.

To increase efficiency, it is known to orient a solar energy device in the direction of maximum exposure to the sun's energy throughout the day. This orientation control, known as solar tracking, can increase the energy output throughout a day by approximately 20-40% over a fixed orientation solar energy device. Solar trackers generally track the sun's movement in either a single axis or using two axes. Single axis trackers have one axis of rotation, which may be oriented horizontally, vertically, or tilted at some angle to horizontal, with the tilt angle commonly adjusted based on latitude of the installation. Dual axis trackers are able to follow the sun in both horizontal and vertical directions and therefore provide optimum solar energy output for a solar energy system. However, tracking the sun's movement based on a single axis provides the most benefit over a fixed orientation with approximately 30% in increased output, with the additional axis of tracking providing only another approximately 6% in energy output.

Solar tracking is generally accomplished with either an active or passive control system. Active solar trackers use sensors or pre-determined data to find the current position of the sun, and actively orient the solar device to face the sun (e.g., using motors, gears, and computers). While active trackers can use a known solar position to orient and therefore are not prone to inaccuracy due to fluctuations in solar energy (e.g., passing clouds, etc.), they are generally expensive with regard to both initial installation and in maintenance costs. Passive solar trackers orient a solar energy device using the sun's energy and without the use of motors. Currently, both active and passive solar trackers can be a substantial cost component in a solar energy system. For these reasons, many solar installations are fixed orientation and do not use solar trackers.

Often, solar energy devices are deployed in arrays of panels that may be mounted at a fixed angle facing south (in the northern Hemisphere), or mounted to a frame that rotates to track the sun. For large electric utility or industrial applications, dozens or hundreds of solar panels may be installed in rows of assemblies, where each solar panel assembly is configured to rotate to track the sun. Generally, current tracking systems use rigid structures and drive systems to move a multitude of solar panels in a solar tracking fashion. These systems present challenges in conforming to undulations and variations in the surface they are installed on. Thus, for ground mounted systems, there is a large amount of expensive grading that needs to be performed.

SUMMARY

Aspects of the present disclosure are directed to a cable drive system for solar tracking for solar array systems including one or more solar panel assemblies. The cable drive system allows a single drive device to control solar tracking for multiple solar panel assemblies that may be installed on uneven mounting surfaces such as roofs of buildings or ground with uneven grading. In some examples, a return force for returning the solar array system, including the drive device, to the initial position at the end of the day is provided by a tension device such as a weight or spring.

According to some aspects, a system for solar tracking for a solar array is described. The solar array may include one or more solar panel assemblies, where each of the one or more solar panel assemblies may include one or more solar energy devices mounted to a rotatable member. The system may include a drive pulley, a drive device coupled to the drive pulley and configured to rotate the drive pulley in a first direction based on azimuthal solar travel during a day, a first flexible drive member segment at least partially wound around the drive pulley such that rotation of the drive pulley in the first direction causes a portion of the first flexible drive member segment to take up on the drive pulley, and one or more driven pulleys coupled to and rotationally interlocked with respective rotatable members of the one or more solar panel assemblies, the first flexible drive member segment at least partially wound around a first driven pulley of the one or more driven pulleys such that the take-up of the portion of the first flexible drive member segment on the drive pulley causes a rotation of the first driven pulley in a second direction, wherein the rotation of the first driven pulley in the second direction causes rotation of the respective rotatable member such that the respective solar energy device mounted to the respective rotatable member tracks the azimuthal solar travel during the day.

According to some aspects, an apparatus for solar tracking for a solar array is described. The solar array may include one or more solar panel assemblies, where each of the one or more solar panel assemblies may include one or more solar energy devices mounted to a rotatable member. The apparatus may include drive pulley means, drive device means coupled to the drive pulley and configured to rotate the drive pulley means in a first direction based on azimuthal solar travel during a day, first flexible drive means at least partially wound around the drive pulley means such that rotation of the drive pulley means in the first direction causes a portion of the first flexible drive means to take up on the drive pulley means, and first driven pulley means coupled to and rotationally interlocked with a rotatable member of the one or more solar panel assemblies, the first flexible drive means at least partially wound around the first driven pulley means such that the take-up of the portion of the first flexible drive means on the drive pulley means causes a rotation of the first driven pulley means in a second direction, wherein the rotation of the first driven pulley means in the second direction causes rotation of the respective rotatable member such that the respective solar energy device mounted to the respective rotatable member tracks the azimuthal solar travel during the day.

According to some aspects, a method for solar tracking for a solar array is described. The solar array may include one or more solar panel assemblies, where each of the one or more solar panel assemblies may include one or more solar energy devices mounted to a rotatable member. The method may include rotating a drive pulley in a first direction based on azimuthal solar travel during a day, and transferring the rotation of the drive pulley in the first direction to one or more driven pulleys via a first flexible drive member segment, the one or more driven pulleys coupled to and rotationally interlocked with respective rotatable members of the one or more solar panel assemblies, wherein the rotation of the drive pulley in the first direction causes a rotation of the one or more driven pulleys in a second direction via linear movement of the first flexible drive member segment, wherein the rotation of the one or more driven pulleys in the second direction causes rotation of the respective rotatable member such that the respective solar energy device mounted to the respective rotatable member tracks the azimuthal solar travel during the day.

In some examples of the system, apparatus, or methods, a return force to return the drive device to an initial position is not provided by the drive device. In some examples, the system includes a tension device that applies the return force to the first flexible drive member segment. The first flexible drive member segment may be attached to the drive pulley at a first end and attached to the tension device at a second end. The tension device may include any of a spring, a suspended weight, or combinations thereof. A tensile force provided by the tension device may be selected based on a number of solar panel assemblies driven by the first flexible drive member segment. Additionally or alternatively, at least one of the one or more solar energy devices may be mounted off-center relative to the respective rotatable member, imparting a moment force to the respective rotatable member that applies the return force to the first flexible drive member segment via the respective driven pulley.

In some examples, the system, apparatus, or method includes a second flexible drive member segment at least partially wound around the drive pulley such that rotation of the drive pulley in the first direction causes a portion of the second flexible drive member segment to take up on the drive pulley, wherein the second flexible drive member segment is at least partially wound around at least a second driven pulley of the one or more driven pulleys such that the take-up of the portion of the second flexible drive member segment on the drive pulley causes a rotation of the second driven pulley in the second direction. The first flexible drive member segment and the second flexible drive member segment may be different flexible drive members.

In some examples of the system, apparatus, or method, the drive pulley may rotate less than 180 degrees during the day. In some examples, the first flexible drive member segment is wound around the one or more driven pulleys at least one full revolution. Some examples of the system, apparatus, or method may include a clamp on the one or more driven pulleys that prevents the first flexible drive member segment from slipping relative to the one or more driven pulleys.

Some examples of the system, apparatus, or method include one or more hubs rotationally interlocked with the respective rotatable members of the one or more solar panel assemblies, the one or more hubs being rotatably fixed to the respective driven pulleys via a clamping mechanism such that, when the clamping mechanism is in an adjustment mode, the respective rotatable members can be rotatably adjusted relative to the respective driven pulleys with the first flexible drive member segment wound around the respective driven pulleys.

In some examples of the system, apparatus, or method a ratio of a diameter of the drive pulley to a diameter of the one or more driven pulleys is approximately one to one. In some examples of the system, apparatus, or method the first direction and the third direction are a same rotational direction. In some examples of the system, apparatus, or method the drive device may be any of an electric motor, a pneumatic motor, a hydraulic motor, a passive solar tracker, or combinations thereof. In some examples of the system, apparatus, or method, the drive device rotates the drive pulley in the first direction based on expansion of a thermal medium heated by a solar collector that tracks the azimuthal solar travel during the day. In some examples of the system, apparatus, or method, the first flexible drive member segment may be one of a cable, a belt, a rope, or a chain.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIGS. 2A-2C show front views of an example solar array system at various times during a day in accordance with aspects of the present disclosure.

DETAILED DESCRIPTION

The present disclosure is generally directed to a cable drive system for solar tracking for solar array systems. The cable drive system employs one or more cables wound around a drive pulley of a drive device and one or more driven pulleys of solar assemblies The disclosure provides techniques of rotating solar panels that are flexible, inexpensive, and reliable. The techniques can apply to any solar technology that benefit from following the sun.

Figure 1:
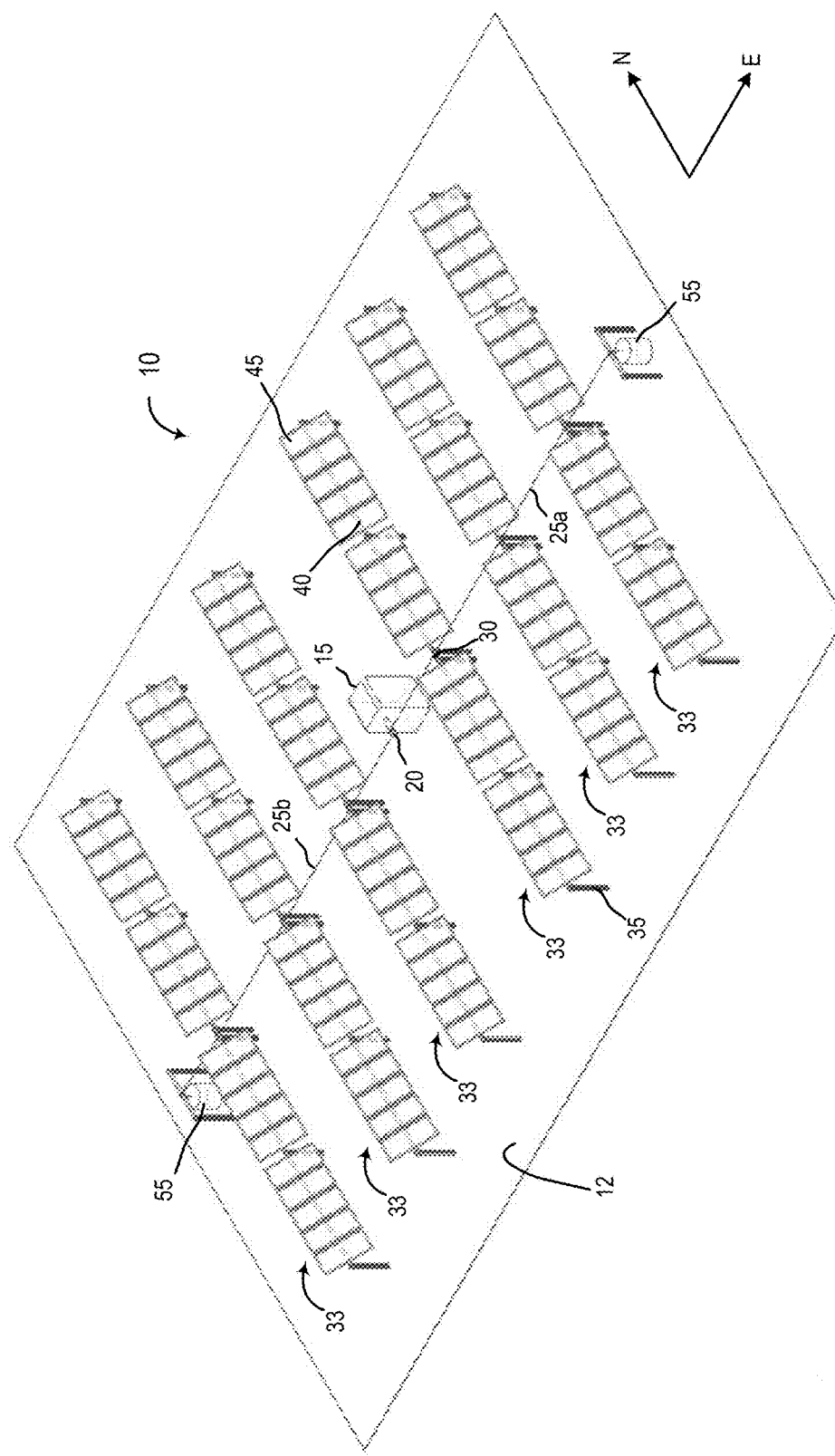
FIG. 1 illustrates a solar array system employing cable drive tracking in accordance with aspects of the present disclosure.

FIG. 1 illustrates a solar array system 10 employing cable drive tracking in accordance with aspects of the present disclosure. Solar array system 10 includes a drive device 15 and multiple solar assemblies 33. Drive device 15 may be anchored to mounting surface 12 (e.g., the ground, the roof of a building, etc.) and has a drive pulley 20 attached to a drive shaft. A cable 25a may be fixed to the drive pulley 20 and may at least partially wrap around the circumference of the drive pulley 20. Cable 25a extends outward from drive pulley 20 to one or more of the solar assemblies 33.

Each solar assembly 33 includes one or more solar energy devices 45 mounted to a strong back 40. Solar energy devices 45 may be any of a variety of devices for capturing solar energy and/or converting solar energy to electricity and/or heat including but not limited to photovoltaic ("PV"), concentrated solar power ("CSP"), solar hot water heaters, solar internal light systems (e.g., hybrid solar lighting, etc.), solar food cookers, solar distilleries, solar crop dryers, solar desalinators, and the like. While the present description generally illustrates solar energy devices 45 as PV solar panels, the disclosed techniques may be used in any solar energy system that may benefit from solar tracking capability.

Strong back 40 may be any type of member that is configured to rotate freely along a central axis. For example, strong back 40 may be rotatably mounted to posts 35, which may be fixed in to the mounting surface 12. In some cases, strong back 40 may generally be mounted having its central axis oriented in the North-South direction. Each solar assembly 33 may have a driven pulley 30 rotationally fixed to the strong back 40 so as driven pulley 30 rotates, strong back 40 also rotates. The cable 25a may wrap at least partially around the circumference of driven pulley 30. In some embodiments, the cable 25a wraps around the driven pulley 30 at least one full revolution. The cable 25a may wrap around the driven pulley more than one full revolution (e.g., one and a half revolutions, two full revolutions, etc.).

Additionally or alternatively, the cable 25a may be made up of separate cable segments, where each segment is attached at either end to the drive pulley or a driven pulley. For example, a first segment may be attached at a first end to drive pulley 20, wrapping at least partially around drive pulley 20 and extending towards the first solar assembly 33 to the East. The second end of the first segment may then wrap at least partially around the driven pulley 30 of the first solar assembly 33 and be attached to the driven pulley 30. Additional segments of cable 25a may then connect each solar assembly 33 to the next one in line in a similar manner.

While the driven pulleys 30 are illustrated in the middle of solar assemblies 33, driven pulleys may be located anywhere along strong backs 40 of the solar assemblies, and may be located at different positions for different assemblies (e.g., the solar assemblies 33 do not need to have the same end-points or be the same length).

FIG. 1 may illustrate solar array system 10 in an initial position (e.g., a configuration of the solar array in the morning), with solar assemblies 33 oriented so that the solar energy devices 45 face East. As the sun rotates through the solar azimuth during the day, the drive device 15 rotates drive pulley 20, which takes up cable 25a onto drive pulley 20, causing the driven pulleys 30 to rotate, which in turn rotate strong backs 40. For clarity, the relative direction of solar travel is described herein for the Northern Hemisphere. However, it should be understood that the principles and techniques discussed herein can be applied in the Southern Hemisphere by appropriate modifications for solar travel. Following conventional nomenclature, azimuth angles are generally given as increasing clockwise from due North, so East is 90°, South is 180° and West is 270°.

Drive device 15 can be any one of several types of devices used for solar tracking of solar array 10. Drive device 15 may include, for example, hydraulics, electric motors, linear actuators, hydrostatic motors, or any other drive device configured to rotate drive pulley 20 such that solar energy devices 45 track the sun as it rotates through the solar azimuth angle throughout the day.

Solar array system 10 may include a tension device 55 that applies tension to cable 25a to oppose the rotation of the drive pulley 20 as it takes up the cable 25a on the drive pulley 20. The tension device 55 may be any type of tension device including springs, weights, and the like. As illustrated in FIG. 1, tension device 55 is a weight that applies tension to cable 25a by being attached to the end of the cable 25a.

In some examples, cable 25b may extend outward from drive pulley 20 in the opposite direction of cable 25a. Cable 25b may be wound around the driven pulleys 30 of other solar assemblies 33. A second tension device 55 may apply tension to cable 25b that opposes the rotation of the drive pulley 20 as it takes up the cable 25b on the drive pulley 20. The second tension device 55 may be any tension device including springs, weights, and the like. Although the term "cable" is used herein, cables 25a and 25b may be any flexible drive member that can be used to transfer rotational force from drive pulley 20 to driven pulleys 30, such as, for example, a cable, belt, rope, chain, and the like. Cable 25a and cable 25b may be elements of the same cable 25, or different cables 25, in some embodiments.

In some embodiments, drive device 15 provides motive force to track the sun during the day but does not provide motive force to return the solar array system 10 to the initial position. Instead, the drive device 15 may be configured to allow solar array system 10 to relax back to the initial position at the end of the day, with the motive force applied by the tension devices 55. In some examples, the tension devices 55 apply the motive force for turning the drive pulley 20 in the opposite direction as the drive device 15, thus providing the motive force to return the drive device 15 itself to the initial position.

FIGS. 2A-2C show front views of an example solar array system 10a at various times during a day, in accordance with aspects of the present disclosure. Example solar array system 10a may illustrate aspects of solar array system 10 of FIG. 1. Solar array system 10a may include a drive device 15 and a first set of solar assemblies 28a, which may be positioned to the East of drive device 15 on mounting surface 12. As illustrated, the first set of solar assemblies 28a includes one solar assembly 33a, however, the first set of solar assemblies 28a may include two or more solar assemblies 33, in some cases.

In the example solar array system 10a shown in FIGS. 2A-2C, cable 25a is fixed to drive pulley 20 and extends out from the top of drive pulley 20 towards the first set of solar assemblies 28a. The cable 25a is at least partially wound around driven pulley 30 of solar assembly 33a and may be connected to tension device 55 which exerts a tensile force 52 on cable 25a. In some examples, cable 25a may be wound around driven pulley 30 at least one full revolution, and may be wound around driven pulley 30 two or more revolutions. Driven pulley 30 may be rotationally interlocked with the strong back 40 (not shown) of solar assembly 33a.

In some examples, solar array system 10a may include a second set of solar assemblies 28b positioned to the West of drive device 15. Cable 25b may be fixed to drive pulley 20 and may extend out from the bottom of drive pulley 20 towards the second set of solar assemblies 28b. As illustrated in FIGS. 2A-2C, the second set of solar assemblies 28b includes solar assembly 33b, with the cable 25b at least partially wrapped around the driven pulley 30 of solar assembly 33b. The cable 25b may be connected to tension device 55.

FIG. 2A shows solar array system 10a in an initial position (e.g., morning orientation) so that solar energy devices 45 are facing East. In embodiments, the initial position may be set to a solar azimuth angle several degrees greater than the lowest solar azimuth angle at sunrise during the year. For example, solar radiation in the early morning may be substantially reduced from mid-day because of greater atmospheric losses. Therefore, it may not be as important to rotate the solar energy devices 45 fully to face the azimuth angle of the sun at sunrise because the solar energy devices 45 will have reduced overall energy output regardless of orientation until sometime later in the morning. Additionally, the reduced solar radiation in the early morning may make it more difficult for solar tracking devices to accurately begin tracking.

As the sun 50 moves across the sky towards the West, drive device 15 rotates drive pulley 20 counter-clockwise, taking up cable 25a and cable 25b on to drive pulley 20. Because cables 25a and 25b are wrapped around driven pulleys 30 of solar assemblies 33a and 33b, respectively, when cables 25a and 25b take up on drive pulley 20, the movement in the cables rotates driven pulleys 30 counter-clockwise. Driven pulleys 30 rotate the strong backs 40 (not shown) of solar assemblies 33a and 33b, which in turn rotates solar energy devices 45 to track the Sun 50 as it rotates in solar azimuth towards the West.

FIG. 2B shows solar array system 10a later in the day, when the sun 50 has moved to a position having a solar azimuth angle of due South. Drive device 15 has overcome the tensile force 52 in cables 25a and 25b provided by tension devices 55, and portions of cables 25a and 25b have been taken up on drive pulley 20. As illustrated in FIGS. 2A-2C, tension devices 55 may be weights suspended via a pulley, which may be a separate pulley as illustrated in FIGS. 2A-2C, or one of the driven pulleys 30, in some cases. As can be seen in FIG. 2B, weights 55 have been lifted up relative to the initial position shown in FIG. 2A by the taking up of cables 25a and 25b on drive pulley 20.

FIG. 2C shows at the end of the day when Sun 50 is positioned in the sky towards the West. As can be seen in FIG. 2C, weights 55 have been lifted to a higher vertical position than in FIG. 2B. When the sun 50 has set (or is low enough in the sky to no longer provide for tracking or energy production) drive device 15 can allow drive pulley 20 to rotate clockwise and pay out cables 25a and 25b. As the drive pulley 20 pays out cables 25a and 25b, weights 55 maintain tension on cables 25a and 25b which turns the driven pulleys 30 of solar assemblies 33a and 33b clockwise. The solar array system 10a then returns to the initial position shown in FIG. 2A so that the solar array system 10a is ready to track the sun 50 again the following day.

In some embodiments, the total angle $\theta_T$ 46 subtended by the solar array system 10a between the initial position shown in FIG. 2A and the end-of-day position shown in FIG. 2C may be 180° or less. In some examples, the total angle $\theta_T$ 46 may be between 90° and 180°. In some embodiments, the drive ratio of the diameter of the drive pulley 20 to the diameter of the driven pulleys 30 may be approximately 1:1. For example, the drive device may be an active or passive solar tracker that rotates the drive pulley 20 through the total angle $\theta_T$ 46 as the sun 50 moves across the sky. With a 1:1 drive ratio for the drive pulley 20 to the driven pulleys 30, the solar energy devices 45 also subtend the same angle throughout the day.

In some embodiments, the drive ratio may be different than 1:1. For example, some implementations such as heliostats may track the sun using reflectors for generating solar energy. The doubling of the angle of incidence of the sun on the heliostat reflector relative to a fixed target may be compensated using a 2:1 drive ratio between the drive pulley 20 and the driven pulleys 30 driving the reflective heliostat elements. Additionally or alternatively, the drive ratio may vary throughout the total angle $\theta_T$ 46. For example, the drive pulley 20 or driven pulleys 30 may be designed such that the drive ratio varies according to a tracking function of the drive device 15. For example, the drive pulley 20 and/or driven pulleys 30 may be elliptical or cam-shaped to provide or compensate for a non-linear tracking function of the drive device 15.

As described above, drive device 15 may be configured to provide the motive force to rotate solar array systems 10 to track the sun across the sky, with the motive force for the solar array systems 10 to return to the initial position being provided by tension devices 55. The tension devices 55 may be designed to provide an amount of tension that overcomes the friction in the solar assemblies 33 for the set of solar assemblies 28 associated with the tension device 55 and to provide the return force for the drive device 15 to return to the initial position. For example, the tension provided by tension devices 55 may be determined based on the sum of the motive force for returning the drive device 15 and the friction in the solar assemblies 33. Additionally or alternatively, the appropriate tensile force may take into account possible wind loading for the solar assemblies 33. Thus, where weights are used as tension devices 55, an appropriate weight may be determined by the number of solar assemblies driven by the cable 25 for which the weight is providing tension. In some examples, the tension may linearly increase with the number of solar assemblies 33 in a given set of solar assemblies 28 associated with the tension device 55.

Figure 3:
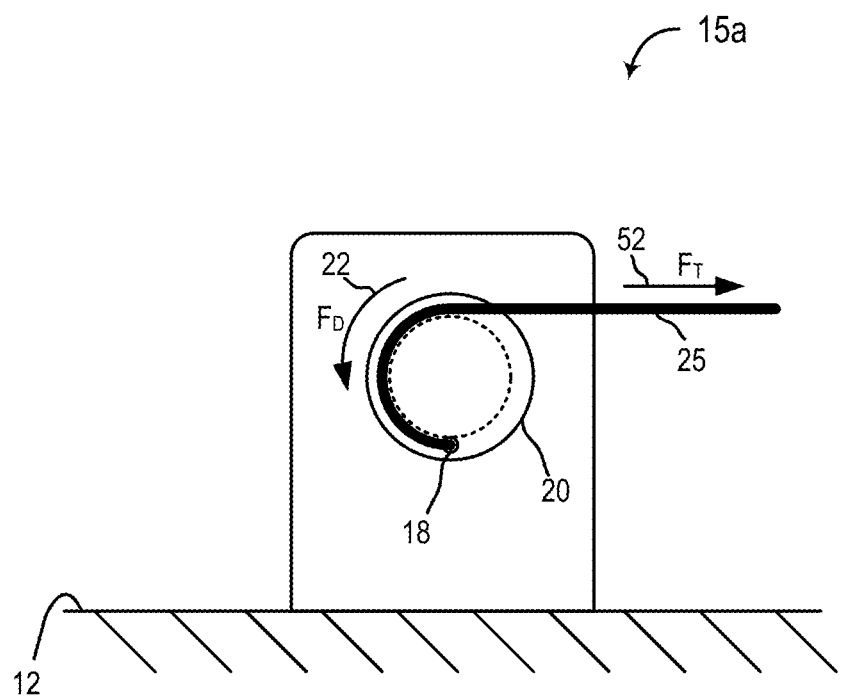
FIG. 3 illustrates a drive device that may be used in the described solar array systems in accordance with aspects of the present disclosure.

FIG. 3 illustrates a drive device 15a that may be used in the solar array systems 10 of FIG. 1 or 2A-2C, in accordance with aspects of the present disclosure. The cable 25 is at least partially wound around the drive pulley 20 of drive device 15a, and may be anchored to the drive pulley 20 at anchor point 18.

Drive device 15a may be configured to provide force $F_D$ 22 to drive pulley 20 to track azimuthal solar travel during the day, while force $F_T$ 52 provided by a tension device 55 (not shown) provides the motive force to return drive pulley 20 to its initial position. Thus, as the azimuthal angle of the sun leads the solar array system 10, drive device 15a increases force $F_D$ 22 until it exceeds tension force $F_T$ 52 and drive pulley 20 rotates counter-clockwise, taking up cable 25 onto drive pulley 20. Once the solar array system 10 has rotated to the current azimuthal angle, moment force $F_D$ 22 imparted by drive device 15a decreases until it equals tension force $F_T$ 52, which holds the solar array system 10 in its orientation facing the azimuthal angle of the sun.

At the end of the day, moment force $F_D$ 22 imparted by drive device 15a decreases until it is less than tension force $F_T$ 52, at which point drive pulley 20 is rotated clockwise back towards the initial position by tension force $F_T$ 52. Thus, drive device 15a provides the motive force for solar array system 10 to track the sun during the day, while the return force for the solar array system 10, including drive device 15a, is provided by the tension device.

Drive device 15a may include a tracking mechanism that increases moment force $F_D$ 22 when a tracking element (e.g., optic axis of a solar concentrator, etc.) is lagging behind the azimuthal angle of the sun, and decreases moment force $F_D$ 22 when the tracking element leads the azimuthal angle of the sun. Thus, moment force $F_D$ 22 will reach a semi-static equilibrium when the tracking element is directly pointed at (or has a fixed offset to) the sun. Drive device 15a may be an active or passive tracking system that includes solar collectors, solar energy detectors, hydraulic motors, electric motors, linear actuators, hydrostatic motors, and the like.

Figure 4:
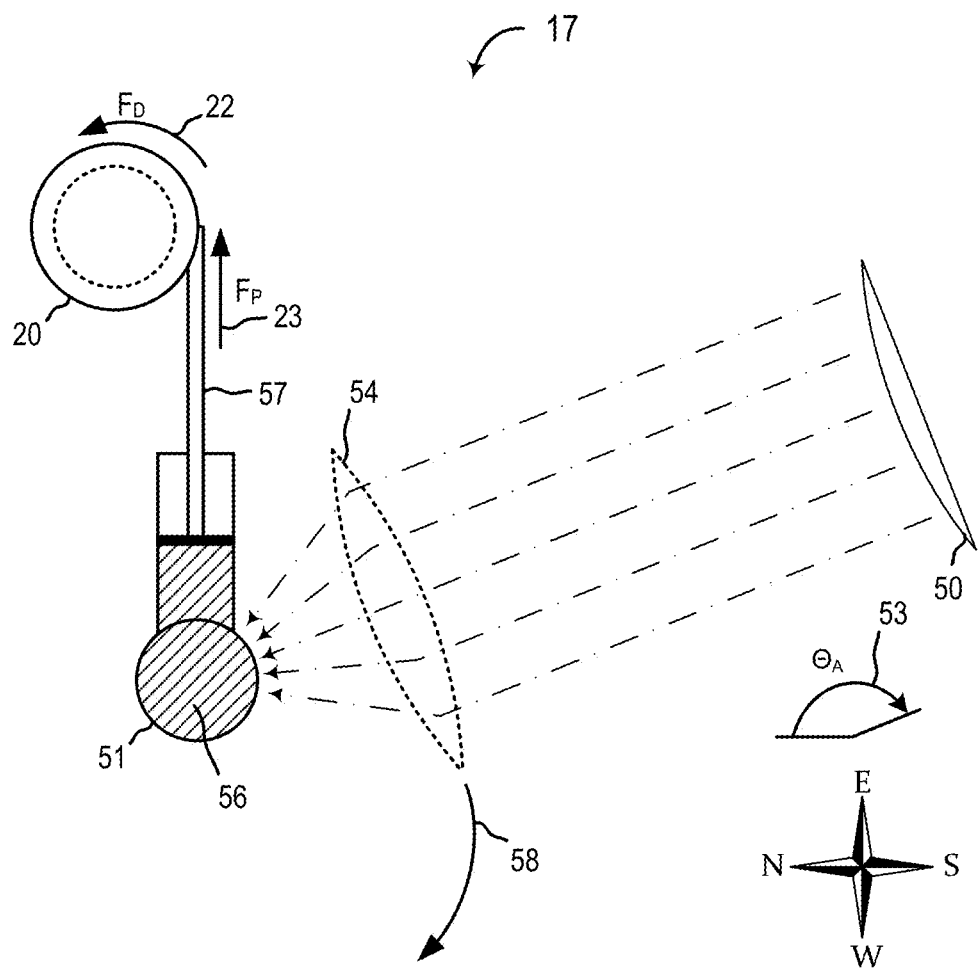
FIG. 4 shows a functional block diagram of a passive tracking device in accordance with aspects of the present disclosure.

In one example, drive device 15a may be a passive drive device that applies the moment force $F_D$ 22 based on expansion of a thermal medium heated by the sun. FIG. 4 shows a functional block diagram of a passive tracking device 17 in accordance with aspects of the present disclosure. FIG. 4 may illustrate, for example, aspects of drive device 15a of FIG. 3. Passive tracking device 17 includes solar receiver 51 that includes a thermal medium 56. When the solar energy collected by receiver 51 heats the thermal medium 56, the thermal medium expands and creates pressure that can be used as the motive force of the passive tracking device 17 to turn the drive pulley 20. For example, the pressure in the receiver 51 may provide force $F_P$ 23 via piston 57, which may be turned into rotational force $F_D$ 22 via a linear to rotational motion linkage such as a slider crank or cam follower. While the example passive tracking device 17 uses the pressure in thermal medium 56 to drive piston 57, the pressure in the receiver 51 may be used to provide rotational force $F_D$ 22 without using a piston. For example, a hydraulic motor may convert pressure of a hydraulic fluid to rotational motion without a piston.

In some examples of passive tracking device 17, the tracking mechanism is provided by shifting the focal point of a solar concentrator or collector 54. If the solar collector 54 is lagging the azimuthal angle 53 of the sun 50, the solar collector 54 will focus the rays of the sun 50 on the receiver 51, heating the thermal medium 56. The thermal medium 56 expands to increase pressure in the receiver 51, which can be used to impart moment force $F_D$ 22 (e.g., via piston force $F_P$ 23 from piston 57, etc.). Moment force $F_D$ 22 may be used to rotate drive pulley 20, and also to rotate solar collector 54 in a direction 58 of increasing azimuthal angle. If the solar collector leads the azimuthal angle $\theta_A$ 53 of the sun 50, the thermal medium 56 will be allowed to cool to decrease moment force $F_D$ 22. At the end of the day, the thermal medium 56 will cool and the thermal medium 56 may be compressed (e.g., via tension force $F_T$ 52 acting on drive pulley 20 as shown in FIG. 3, etc.) to return the passive tracking device 17 to the initial position.

In some examples, the thermal medium 56 may be a phase-change material (PCM) with a relatively high heat of fusion or enthalpy of fusion, meaning that it absorbs a relatively large amount of heat during the latent heat phase when it transitions from a solid or crystalline phase to a liquid phase. Examples of PCMs include parrafin wax, salt hydrates, eutectics, hygroscopic materials, and the like. The appropriate PCM may be selected based on the desired heat of fusion, melting temperature, and the like.

Figure 5:
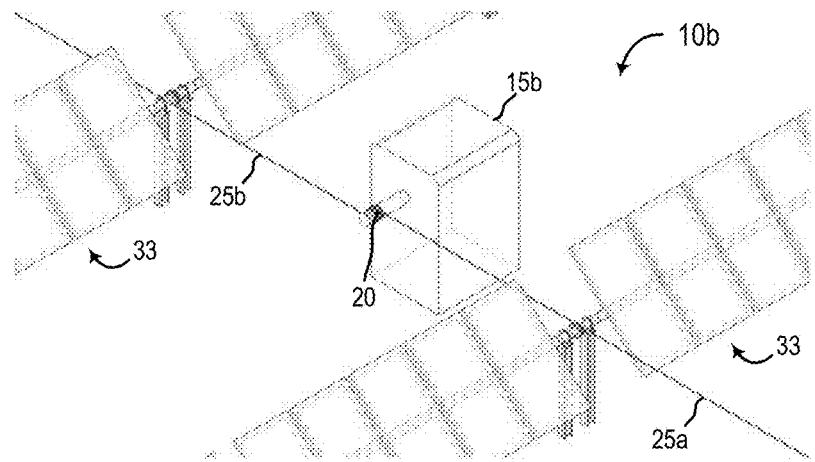
FIG. 5 shows an example solar array system in accordance with aspects of the present disclosure.

Drive device 15 may be configured in any suitable orientation for driving cables 25. FIG. 5 shows an example solar array system 10b in accordance with aspects of the present disclosure. Solar array system 10b may illustrate, for example, aspects of solar array systems 10 of FIG. 1 or 2A-2C. Solar array system 10b includes drive device 15b, where drive device 15b has drive pulley 20 oriented so that the rotational axis of drive pulley 20 is horizontal relative to the mounting surface 12.

Figure 6:
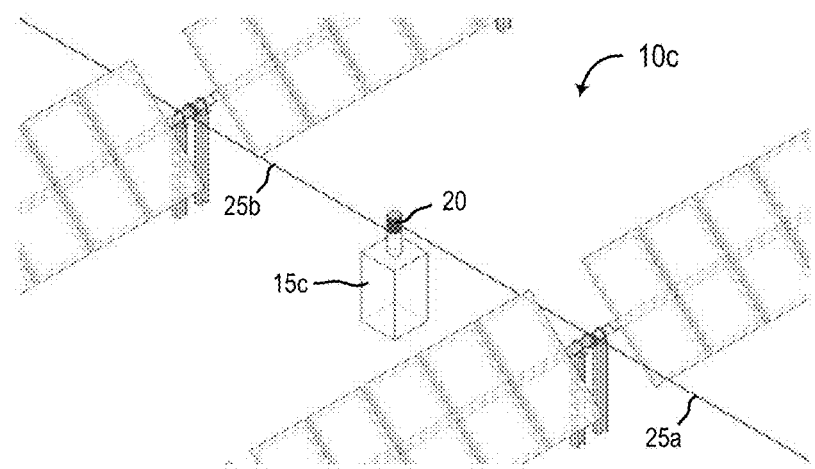
FIG. 6 shows an example solar array system in accordance with aspects of the present disclosure.

FIG. 6 shows an example solar array system 10c in accordance with aspects of the present disclosure. Solar array system 10c may illustrate, for example, aspects of solar array systems 10 of FIG. 1 or 2A-2C. Solar array system 10c includes drive device 15c, where drive device 15c has drive pulley 20 oriented so that the rotational axis of drive pulley 20 is vertical relative to the mounting surface 12.

Figure 7:
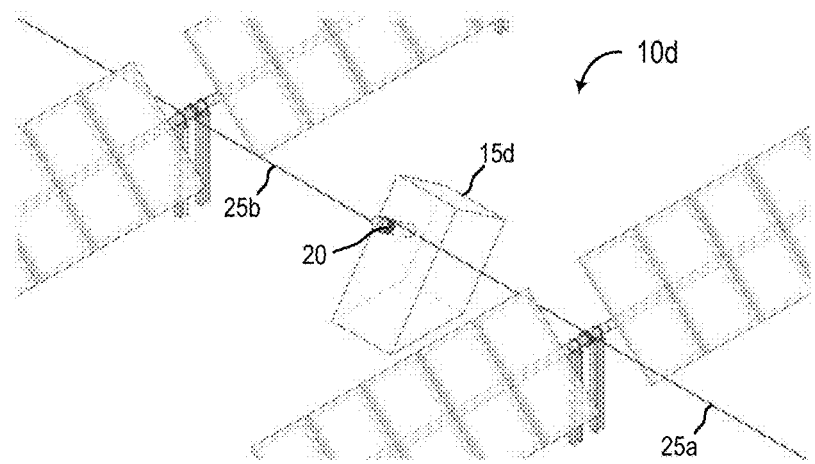
FIG. 7 shows an example solar array system in accordance with aspects of the present disclosure.

FIG. 7 shows an example solar array system 10d in accordance with aspects of the present disclosure. Solar array system 10d may illustrate, for example, aspects of solar array systems 10 of FIG. 1 or 2A-2C. Solar array system 10d includes drive device 15d, where drive device 15d has drive pulley 20 oriented so that the rotational axis of drive pulley 20 is at an angle relative to the mounting surface 12.

Figure 8:
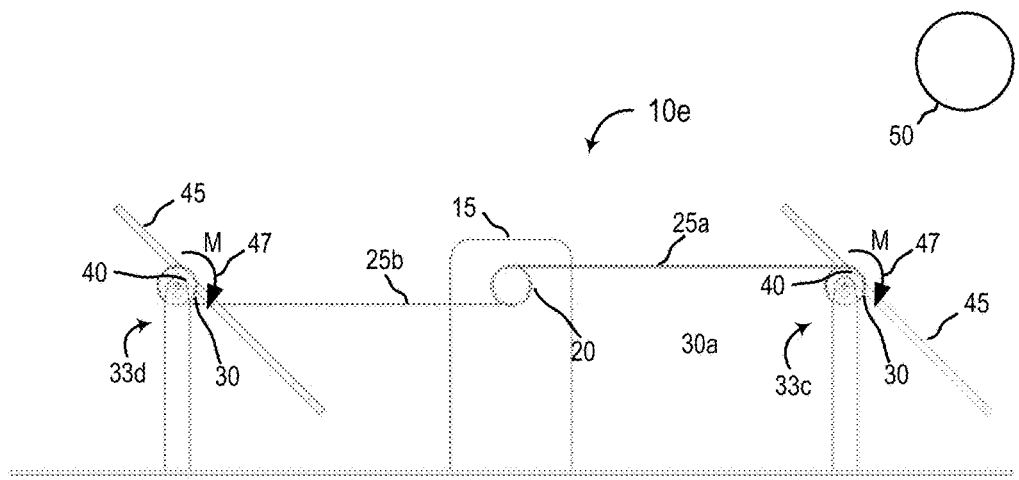
FIG. 8 shows a front view of an alternate configuration of an example solar array system that uses a moment force on strong backs as the tension device in accordance with aspects of the present disclosure.

FIG. 8 shows a front view of an alternate configuration of an example solar array system 10e that uses a moment force on strong backs 40 as the tension device, in accordance with aspects of the present disclosure. Solar array system 10e may illustrate, for example, aspects of solar array systems 10 of FIG. 1, 2A-2C, 5, 6 or 7. In example solar array system 10e, solar energy devices 45 are positioned off-center on strong back 40, imparting a moment force M 47 on strong backs 40, which in turn transfers the moment force M 47 to the driven pulleys 30.

As the sun 50 moves across the sky towards the West, drive device 15 rotates drive pulley 20 counter-clockwise, overcoming the tension in cables 25a and 25b imparted by the moment force M 47. Thus, drive pulley 20 takes up cable 25a and cable 25b, which in turn rotates driven pulleys 30 and strong backs 40 counter-clockwise so that solar energy devices 45 track the sun 50. When the sun 50 has set in the West (or is low enough in the sky to no longer provide for tracking or energy production) drive device 15 can allow drive pulley 20 to rotate clockwise and pay out cables 25a and 25b. As the drive pulley 20 pays out cables 25a and 25b, the moment force M 47 from the off-center solar energy devices 45 turns the driven pulleys 30 of solar assemblies 33a and 33b clockwise to return the solar array system 10e to the initial position shown in FIG. 7 to be ready to track the sun 50 the following day.

In the example solar array system 10e, the moment force M 47 is provided by offsetting solar energy devices 45 on strong backs 40. Additionally or alternatively, weights could be added to one side of solar energy devices 45 to impart moment force M 47.

Figure 9:
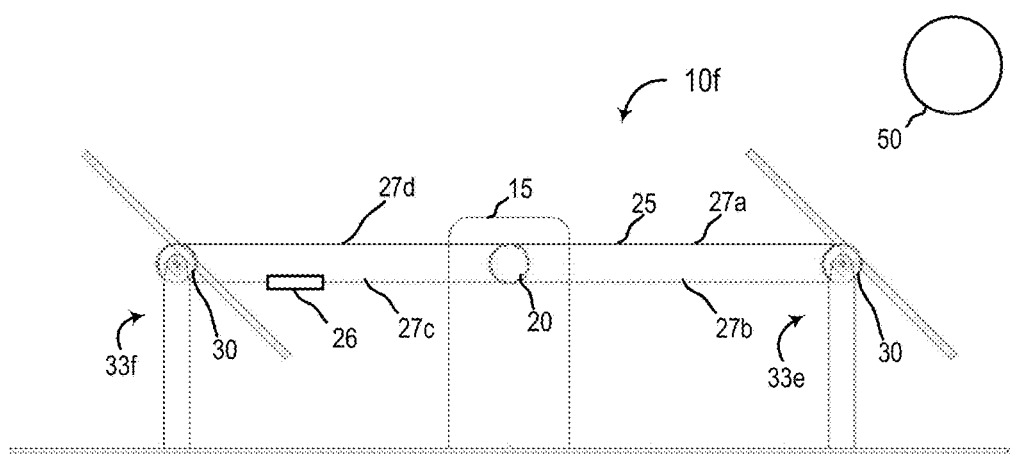
FIG. 9 shows a front view of an alternate configuration of an example solar energy system in accordance with aspects of the present disclosure.

FIG. 9 shows a front view of an alternate configuration of an example solar energy system 10f, in accordance with aspects of the present disclosure. Solar array system 10f may illustrate, for example, aspects of solar array systems 10 of FIG. 1, 2A-2C, 5, 6 or 7. In solar array system 10f, drive device 15 can provide the motive force to rotate solar energy devices 45 to track the sun 50 during the day, and also to return the solar array system 10f to its initial position facing East at the end of the day. For example, drive device 15 can rotate drive pulley 20 counter-clockwise to take up cable segment 27a on drive pulley 20, thus applying the motive force through tension on cable segment 27a to rotate the solar energy devices of solar assembly 33e to track the sun 50. As the driven pulley 30 for solar assembly 33e rotates, the tension in cable segment 27a is transferred to cable segments 27b and 27c, which then rotate the solar energy devices 45 of solar assembly 33f via driven pulley 30 to also track the sun 50. In some examples, a cable tensioning device 26 may be inserted into cable 25 to provide tension in the cable 25 for providing friction as the cable wraps around drive pulley 20 or driven pulleys 30. Cable tensioning device 26 may be a spring, turnbuckle, tensioning pulley, or other cable tension device as is known in the art.

Figure 10:
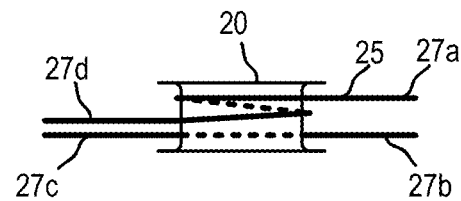
FIG. 10 illustrates a top view of an example configuration for winding a cable on the drive pulley in the example solar energy system illustrated in FIG. 9, in accordance with aspects of the present disclosure.

FIG. 10 illustrates a top view of an example configuration for winding cable 25 on drive pulley 20 in example solar energy system 10f, in accordance with aspects of the present disclosure. In the example configuration for cable 25 illustrated in FIG. 10, cable segment 27a extends from the top of drive pulley 20 towards the East, while cable segment 27b returns and passes under the drive pulley 20, extending towards the West as cable segment 27c. Cable segment 27c then wraps around the driven pulleys 30 (not shown) of one or more solar assemblies to the West of the drive pulley 20, before returning to wrap back onto drive pulley 20 as cable segment 27d.

Figure 11:
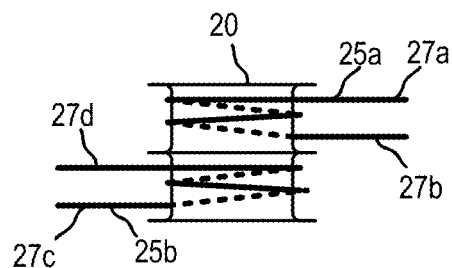
FIG. 11 illustrates a top view of an example configuration for winding a cable on the drive pulley in the example solar energy system illustrated in FIG. 9, in accordance with aspects of the present disclosure.

FIG. 11 illustrates a top view of an alternative configuration for winding cable 25 on drive pulley 20 in example solar energy system 10f, in accordance with aspects of the present disclosure. In the example configuration for cable 25 illustrated in FIG. 11, cable 25 includes a first cable 25a extending to the East to one or more solar assemblies 33 (not shown), and a second cable 25b extending to the West to one or more solar assemblies 33 (not shown). Cable segment 27a of cable 25a extends from the top of drive pulley 20 towards the solar assemblies to the East, while cable segment 27b returns to the bottom of drive pulley 20 to wrap around and become cable segment 27a again. Similarly, cable segment 27d of cable 25b extends from the top of drive pulley 20 towards the solar assemblies to the West, while cable segment 27c returns to the bottom of drive pulley 20 to wrap around and become cable segment 27d again.

Figure 12:
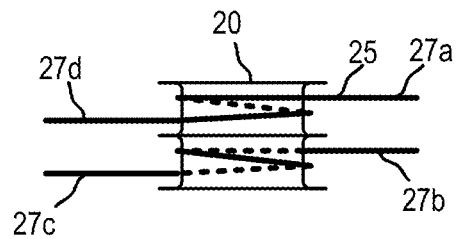
FIG. 12 illustrates a top view of an example configuration for winding a cable on the drive pulley in the example solar energy system illustrated in FIG. 9, in accordance with aspects of the present disclosure.

FIG. 12 illustrates a top view of yet another alternative configuration for winding cable 25 on drive pulley 20 in example solar energy system 10f, in accordance with aspects of the present disclosure. In the example configuration for cable 25 illustrated in FIG. 12, cable segment 27a extends from the top of drive pulley 20 towards the East, while cable segment 27b returns to the bottom of drive pulley 20 and wraps around drive pulley 20 to become cable segment 27c extending from the bottom of drive pulley 20 towards the West as cable segment 27c. Cable segment 27c then wraps around the driven pulleys 30 (not shown) of one or more solar assemblies to the West of the drive pulley 20, before returning to the top of drive pulley 20 and wrapping around drive pulley 20 to become cable segment 27a again.

Figure 13:
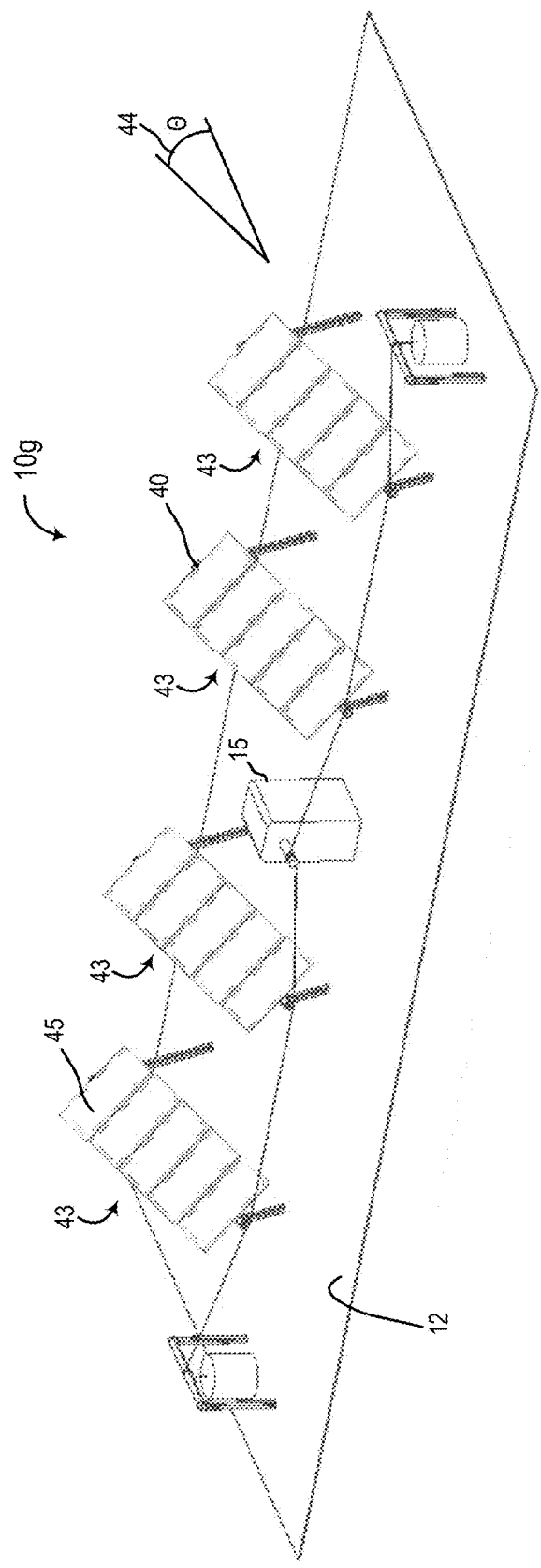
FIG. 13 shows an isometric view of an alternative configuration of a solar array system using tilted solar assemblies in accordance with aspects of the present disclosure.

FIG. 13 shows an isometric view of an alternative configuration of a solar array system 10g using tilted solar assemblies 43, in accordance with aspects of the present disclosure. In tilted solar assemblies 43, strong backs 40 are generally oriented North-South and tilted at a tilt angle θ 44 relative to horizontal. Tilted solar assemblies 43 can give a higher energy yield from solar panels 45, at various latitudes. The tilt angle θ 44 may be related to the solar elevation angle of the sun's path across the sky at the latitude of installation of the solar energy system 10g. The tilt angle for the tilted azimuth tracking configuration of solar energy system 100 may be set in a variety of ways. For example, tilt angle θ 44 may be determined by an average maximum solar elevation at a given latitude or selected to maximize energy generation. In embodiments, tilt angle θ 44 may be adjusted at various times throughout the year using tilt adjustment mechanisms, as is known in the art.

Figure 14:
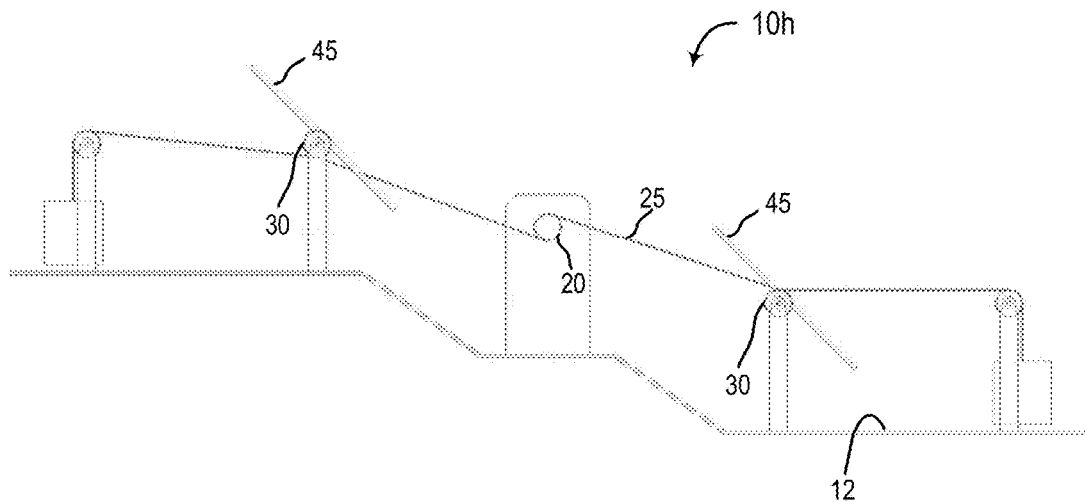
FIG. 14 shows a front view of an alternative configuration of a solar array system where the mounting surface is not level, in accordance with aspects of the present disclosure.

FIG. 14 shows a front view of an alternative configuration of a solar array system 10h where mounting surface 12 is not level. As can be seen, the drive pulley 20 and driven pulleys 30 of the solar assemblies 33 do not need to be level with each other for the cable drive system to function properly. Thus, the cable drive system described above allows solar assemblies 33 or 43 to be placed on uneven ground, which may cut site preparation costs (e.g., grading, etc.) substantially.

Figure 15:
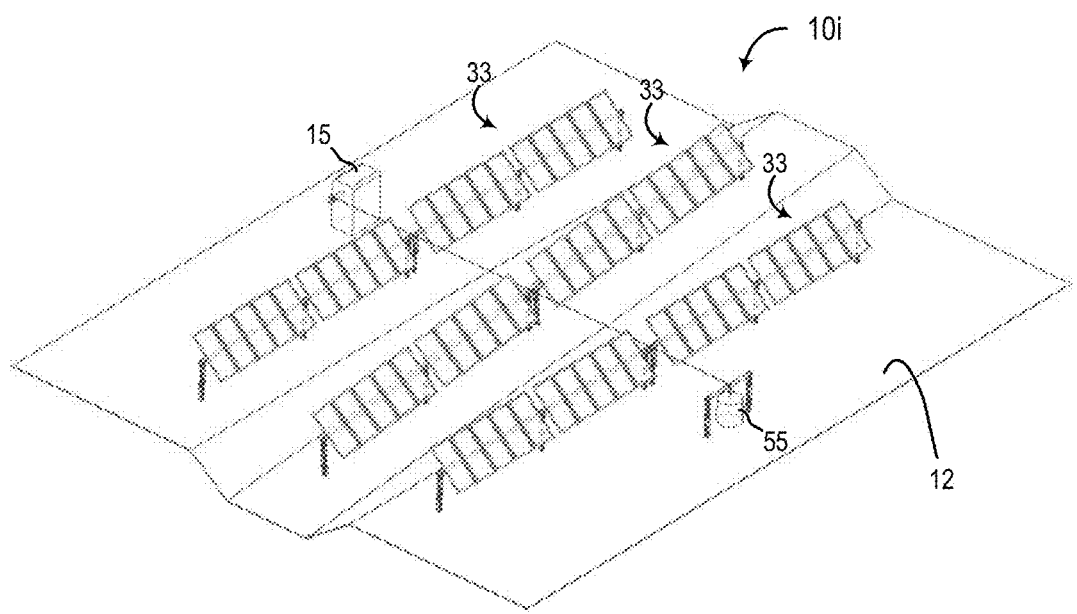
FIG. 15 shows an isometric view of an alternative configuration of a solar array system where the solar assemblies are tilted relative to each other, in accordance with aspects of the present disclosure.

FIG. 15 shows an isometric view of an alternative configuration of a solar array system 10i where the mounting surface 12 is not level and solar assemblies 33 are tilted relative to each other. Thus, the strong backs of the solar assemblies 33 do not need to be in the same plane in order for the cable drive system to effectively rotate each of the solar assemblies 33 to track the sun. In solar array system 10*i*, drive device 15 is positioned at one end of the solar array system 10*i*, with a single tension device 55 at the opposite end.

Referring back to FIGS. 2A-2C, cable 25 may be wound around driven pulleys 30 and the friction provided by the tension in the cable (e.g., provided by the tension device 55, etc.) may rotate driven pulleys 30 as the cable 25 is taken up on the drive pulley 20. Additionally or alternatively, cable 25 may be attached or clamped to driven pulley 30 in various ways.

Figure 16A:
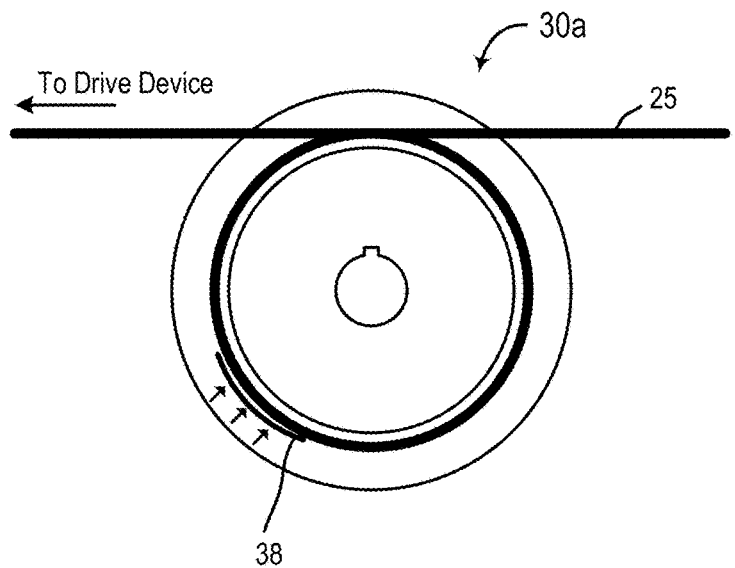
FIGS. 16A and 16B show front views of an example driven pulley including a cable clamp in accordance with aspects of the present disclosure.

FIG. 16A is a front view of an example driven pulley 30*a* including a cable clamp in accordance with aspects of the present disclosure. Cable 25 may come from the drive pulley 20 or another driven pulley 30, with the direction of the drive device shown for a driven pulley 30*a* located to the East of the drive device. From the direction of the drive device, cable 25 may wrap at least partially around driven pulley 30*a*, and may be wrapped at least one full revolution around driven pulley 30*a*, in some cases.

Figure 16B:
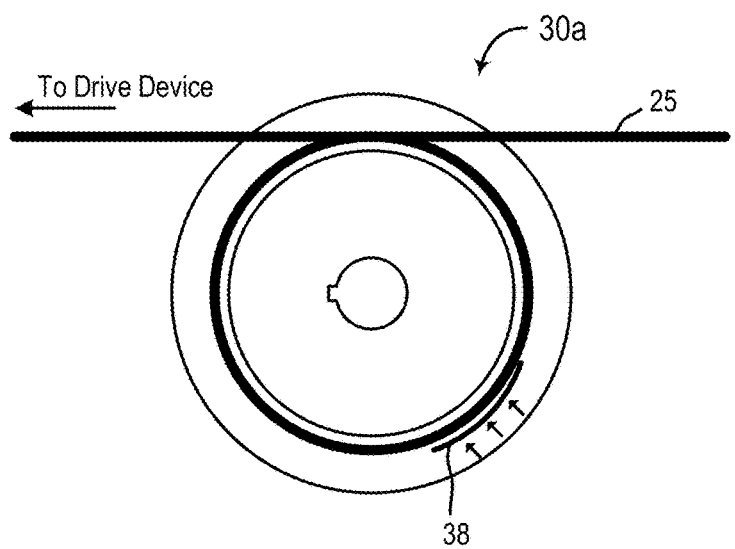

FIG. 16A may illustrate driven pulley 30*a* when the solar array system 10 is in the initial (e.g., morning) position, and cable clamp 38 may be installed in a position where the clamp will not rotate to interfere with the cable taking up or paying out when the driven pulley rotates throughout the day. As discussed above, the driven pulley may rotate less than 180 degrees, and in some cases approximately 90 degrees during the day. Coming from the direction of the drive device, cable 25 may wrap around driven pulley 30*a* at least the distance that driven pulley 30*a* rotates during the day before being clamped by cable claim 38. Thus, when the driven pulley rotates during the day to the final position shown in FIG. 16B, cable clamp 38 is still located away from where the cable 25 is wound on the driven pulley 30*a*. Cable clamp 38 may be any suitable type of clamp to keep cable 25 from slipping relative to the driven pulley 30*a*, as is known in the art.

As discussed above, cable 25 may be made up of multiple cable segments, where each cable segment is attached on either end to the drive pulley 20 or a driven pulley 30 using appropriate fittings or clamps. From the direction of the drive device, each segment may be wrapped around the respective driven pulley 30*a* at least the distance that driven pulley 30*a* rotates during the day before being attached.

In some embodiments, driven pulleys 30 may be rotationally adjustable relative to strong backs 40 to allow fine tuning of the position of solar energy devices 45 of the solar assemblies 33. Adjustment of strong backs 40 in a solar array system 10 may be desired because of cable stretch or other circumstances (e.g., shifting due to a wind event, etc.) once the system has been installed.

Figure 17:
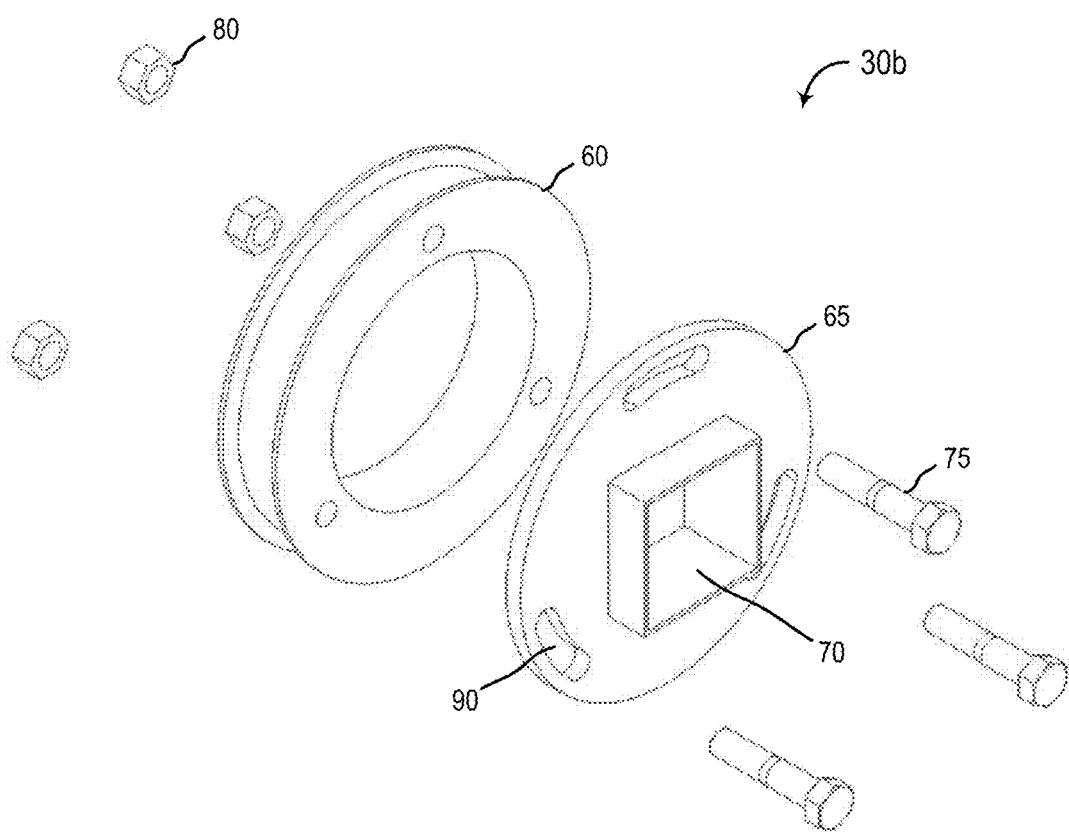
FIG. 17 is an exploded view of an example adjustable driven pulley in accordance with aspects of the present disclosure.

FIG. 17 is an exploded view of an example adjustable driven pulley 30*b* in accordance with aspects of the present disclosure. Adjustable driven pulley 30*b* may, illustrate, for example, aspects of driven pulleys 30 of FIG. 1, 2A-2C, 5-15, 16A or 16B. Adjustable driven pulley 30*b* includes inner hub 65 that is attached to strong back 40 (not shown) by way of inner hub boss 70. Outer pulley 60 attaches to inner hub 65 by clamping force from one or more bolts 75 and nuts 80. However, the position of outer pulley 60 is rotatable relative to inner hub 65 by means of a collection of radial positioned slots 90 on inner hub 65. The clamping mechanism provided by bolts 75 and nuts 80 can be loosened to provide an adjustment mode of adjustable driven pulley 30*b*. In the adjustment mode, the fine rotational positioning of the attached solar energy devices 45 (not shown) can be adjusted by rotating the respective inner hub boss 70. Once the adjustment is made, the clamping mechanism can be tightened to return to an operational mode where the inner hub 65 is rotationally interlocked with the outer pulley 60.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

The invention claimed is:

1. A system for solar tracking for a solar array, the solar array comprising one or more solar panel assemblies, each of the one or more solar panel assemblies comprising one or more solar energy devices mounted to a rotatable member, the system comprising:
   a drive pulley;
   a drive device coupled to the drive pulley and configured to provide a first motive force to rotate the drive pulley in a first direction based on azimuthal solar travel during a day;
   a first flexible drive member segment at least partially wound around the drive pulley such that rotation of the drive pulley in the first direction causes a portion of the first flexible drive member segment to take up on the drive pulley; and
   one or more driven pulleys coupled to and rotationally interlocked with respective rotatable members of the one or more solar panel assemblies, the first flexible drive member segment at least partially wound around a first driven pulley of the one or more driven pulleys such that the first flexible drive member segment couples the first motive force from the drive pulley to cause a rotation in the first direction of the first driven pulley from an initial position to a final position, wherein the rotation of the first driven pulley in the first direction causes rotation of the respective rotatable member such that the respective solar energy device mounted to the respective rotatable member tracks the azimuthal solar travel during the day, and wherein, to return the first driven pulley to the initial position, the drive device is configured to reduce the first motive force in the first direction to be less than a second motive force that rotates the first driven pulley in a second direction that is opposite of the first direction, the second motive force not being provided by the drive device.

2. The system of claim 1, further comprising:
a tension device that applies the second motive force to the first flexible drive member segment.

3. The system of claim 2, wherein the first flexible drive member segment is attached to the drive pulley at a first end and attached to the tension device at a second end.

4. The system of claim 2, wherein the tension device comprises any of a spring, a suspended weight, or combinations thereof.

5. The system of claim 2, wherein a tensile force provided by the tension device is selected based on a number of solar panel assemblies driven by the first flexible drive member segment.

6. The system of claim 1, wherein at least one of the one or more solar energy devices is mounted off-center relative to the respective rotatable member, imparting a moment force to the respective rotatable member that applies the second motive force to the first flexible drive member segment via the respective driven pulley.

7. The system of claim 1, further comprising:
a second flexible drive member segment at least partially wound around the drive pulley such that rotation of the drive pulley in the first direction causes a portion of the second flexible drive member segment to take up on the drive pulley, wherein the second flexible drive member segment is at least partially wound around at least a second driven pulley of the one or more driven pulleys such that the take-up of the portion of the second flexible drive member segment on the drive pulley causes a rotation of the second driven pulley in the first direction.

8. The system of claim 7, wherein the first flexible drive member segment and the second flexible drive member segment comprise different flexible drive members.

9. The system of claim 1, wherein the drive pulley rotates less than 180 degrees during the day.

10. The system of claim 1, wherein the first flexible drive member segment is wound around the one or more driven pulleys at least one full revolution.

11. The system of claim 1, further comprising:
a clamp on the one or more driven pulleys that prevents the first flexible drive member segment from slipping relative to the one or more driven pulleys.

12. The system of claim 1, further comprising:
one or more hubs rotationally interlocked with the respective rotatable members of the one or more solar panel assemblies, the one or more hubs being rotatably fixed to the respective driven pulleys via a clamping mechanism such that, when the clamping mechanism is in an adjustment mode, the respective rotatable members can be rotatably adjusted relative to the respective driven pulleys with the first flexible drive member segment wound around the respective driven pulleys.

13. The system of claim 1, wherein a ratio of a diameter of the drive pulley to a diameter of the one or more driven pulleys is approximately one to one.

14. The system of claim 1, wherein the drive device comprises any of an electric motor, a pneumatic motor, a hydraulic motor, a passive solar tracker, or combinations thereof.

15. The system of claim 1, wherein the drive device rotates the drive pulley in the first direction based on expansion of a thermal medium heated by a solar collector that tracks the azimuthal solar travel during the day.

16. The system of claim 1, wherein the first flexible drive member segment comprises one of a cable, a belt, a rope, or a chain.

17. An apparatus for solar tracking for a solar array, the solar array comprising one or more solar panel assemblies, each of the one or more solar panel assemblies comprising one or more solar energy devices, the apparatus comprising:
drive means to provide a first motive force in a first direction based on azimuthal solar travel during a day;
rotational means to rotate the one or more solar panel assemblies; and
coupling means to couple the first motive force from the drive means to cause a rotation in the first direction of the rotational means from an initial position to a final position, wherein the rotation of the rotational means in the first direction causes rotation of the one or more solar panel assemblies such that the one or more solar energy devices track the azimuthal solar travel during the day, wherein, to return the rotational means to the initial position, the drive means reduces the first motive force in the first direction to be less than a second motive force that rotates the rotational means in a second direction that is opposite of the first direction, the second motive force not being provided by the drive means.

18. The apparatus of claim 17, further comprising:
tension means for applying the second motive force to the rotational means.

19. A method for solar tracking for a solar array, the solar array comprising one or more solar panel assemblies, each of the one or more solar panel assemblies comprising one or more solar energy devices mounted to a rotatable member, the method comprising:
providing, by a drive device, a first motive force to rotate a drive pulley in a first direction based on azimuthal solar travel during a day;
transferring the rotation of the drive pulley in the first direction to one or more driven pulleys via a first flexible drive member segment, the one or more driven pulleys coupled to and rotationally interlocked with respective rotatable members of the one or more solar panel assemblies, wherein the rotation of the drive pulley in the first direction causes a rotation of the one or more driven pulleys in the first direction from an initial position to a final position via linear movement of the first flexible drive member segment, wherein the rotation of the one or more driven pulleys in the first direction causes rotation of the respective rotatable member such that the respective solar energy device mounted to the respective rotatable member tracks the azimuthal solar travel during the day; and
returning the one or more driven pulleys to the initial position by reducing, by the drive device, the first motive force in the first direction to be less than a second motive force that rotates the one or more driven pulleys in a second direction that is opposite of the first direction, the second motive force not being provided by the drive device.

* * * * *